US010782699B2

United States Patent
Tao et al.

(10) Patent No.: US 10,782,699 B2
(45) Date of Patent: Sep. 22, 2020

(54) REAL-TIME PERCEPTION ADJUSTMENT AND DRIVING ADAPTION BASED ON SURROUNDING VEHICLES' BEHAVIOR FOR AUTONOMOUS DRIVING VEHICLES

(71) Applicant: Baidu USA LLC, Sunnyvale, CA (US)

(72) Inventors: Jiaming Tao, Sunnyvale, CA (US); Dong Li, Sunnyvale, CA (US); Yifei Jiang, Sunnyvale, CA (US); Liangliang Zhang, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 195 days.

(21) Appl. No.: 15/917,575

(22) Filed: Mar. 10, 2018

(65) Prior Publication Data

US 2019/0278277 A1    Sep. 12, 2019

(51) Int. Cl.
*G08G 5/04*    (2006.01)
*G05D 1/02*    (2020.01)
(Continued)

(52) U.S. Cl.
CPC ....... *G05D 1/0214* (2013.01); *G01C 21/3415* (2013.01); *G01C 21/3461* (2013.01);
(Continued)

(58) Field of Classification Search
CPC .. G05D 1/0291; G05D 1/0088; G05D 1/0212; G05D 1/0268; G05D 2201/0212;
(Continued)

(56) References Cited

U.S. PATENT DOCUMENTS 9,997,080 B1*    6/2018    Chambers .............. G08G 5/045
2017/0158193 A1*    6/2017    Lopez .................. B60W 40/04
(Continued)

OTHER PUBLICATIONS

Claussmann et al., A Review of Motion Planning for Highway Autonomous Driving, 2019, IEEE, p. 1-23 (Year: 2019).*

(Continued)

*Primary Examiner* — McDieunel Marc
(74) *Attorney, Agent, or Firm* — Womble Bond Dickinson (US) LLP

(57) ABSTRACT

A real-time perception adjustment and correction and driving adaption method for autonomous driving is provided. The system will analyze the driving behaviors of surrounding vehicles surrounding an ADV, which is utilized to improve its original perception based on the analysis and to adapt to the updated driving environment. In one embodiment, in addition to the perception information provided by the sensors, the system analyzes the behaviors of the surrounding vehicles based on the perception information. Based on the behaviors of the surrounding vehicles, the system may detect there is may be an obstacle that has not been detected based on the perception information. Alternatively, the system may detect that an obstacle determined based on the perception information actually may not exist based on the behaviors of the surrounding vehicles. The paths created for the ADV may then adjusted accordingly to improve the autonomous driving of the ADV.

21 Claims, 14 Drawing Sheets

(51) Int. Cl.
*G08G 1/16* (2006.01)
*G01C 21/34* (2006.01)
*G05D 1/00* (2006.01)
*G06K 9/00* (2006.01)
*G06K 9/62* (2006.01)

(52) U.S. Cl.
CPC ........... *G05D 1/0088* (2013.01); *G05D 1/024* (2013.01); *G05D 1/027* (2013.01); *G05D 1/0246* (2013.01); *G05D 1/0257* (2013.01); *G05D 1/0274* (2013.01); *G05D 1/0278* (2013.01); *G08G 1/166* (2013.01); *G05D 2201/0213* (2013.01); *G06K 9/00785* (2013.01); *G06K 9/00805* (2013.01); *G06K 9/6289* (2013.01)

(58) Field of Classification Search
CPC ............ G08G 1/202; G08G 5/04; G06N 5/04; G06Q 10/06311; B60W 50/14
See application file for complete search history.

(56) References Cited

U.S. PATENT DOCUMENTS

| | | | | |
|---|---|---|---|---|
| 2018/0164827 | A1* | 6/2018 | Chu | G01C 21/3415 |
| 2018/0190016 | A1* | 7/2018 | Yang | G06T 7/73 |
| 2019/0079523 | A1* | 3/2019 | Zhu | G08G 1/16 |
| 2019/0079528 | A1* | 3/2019 | Zhu | B60W 30/143 |
| 2019/0086930 | A1* | 3/2019 | Fan | G05D 1/0223 |
| 2019/0143972 | A1* | 5/2019 | Ishioka | G08G 1/167 701/70 |
| 2019/0196481 | A1* | 6/2019 | Tay | G05D 1/0214 |
| 2019/0204834 | A1* | 7/2019 | Harrison | G01S 7/417 |
| 2019/0235516 | A1* | 8/2019 | Zhang | G05D 1/0088 |
| 2019/0236955 | A1* | 8/2019 | Hu | G08G 1/09675 |
| 2019/0250000 | A1* | 8/2019 | Zhang | G01C 21/3407 |
| 2019/0278284 | A1* | 9/2019 | Zhang | G06F 9/545 |
| 2019/0302761 | A1* | 10/2019 | Huang | G02B 27/017 |
| 2019/0302768 | A1* | 10/2019 | Zhang | G05D 1/0212 |
| 2019/0317505 | A1* | 10/2019 | Li | G01C 21/3407 |
| 2019/0317509 | A1* | 10/2019 | Zhang | G05D 1/0088 |
| 2019/0359205 | A1* | 11/2019 | Xu | G06K 9/00342 |
| 2019/0391585 | A1* | 12/2019 | Zhang | B60W 30/09 |
| 2020/0031340 | A1* | 1/2020 | Tao | G05D 1/0223 |
| 2020/0122721 | A1* | 4/2020 | Zhang | G06K 9/00798 |

OTHER PUBLICATIONS

Gao et al., Comparison on driving behavior between manned and unmanned ground vehicles, 2011, IEEE, p. 522-526 (Year: 2011).*
Vicentini et al., A Platform for Designing Solutions for Automotive Autonomous Driving based on Evolutionary Robotics approach, 2007, IEEE, p. 900-905 (Year: 2007).*
Luettel et al., Autonomous Ground Vehicles—Concepts and a Path to the Future, 2012, IEEE, p. 1831-1839 (Year: 2012).*
Unterholzner et al., Active Perception for Autonomous Vehicles, 2012, IEEE, p. 1620-1627 (Year: 2012).*
Mitra et al., Towards Modeling of Perception Errors in Autonomous Vehicles, 2018, IEEE, p. 3024-3029 (Year: 2018).*
Yuan et al., Object Matching for Inter-Vehicle Communication Systems—An IMM-Based Track Association Approach With Sequential Multiple Hypothesis Test, 2017, IEEE, p. 3501-3512 (Year: 2017).*
Realpe et al., Towards Fault Tolerant Perception for autonomous vehicles: Local Fusion, 2015, IEEE, p. 253-258 (Year: 2015).*

* cited by examiner

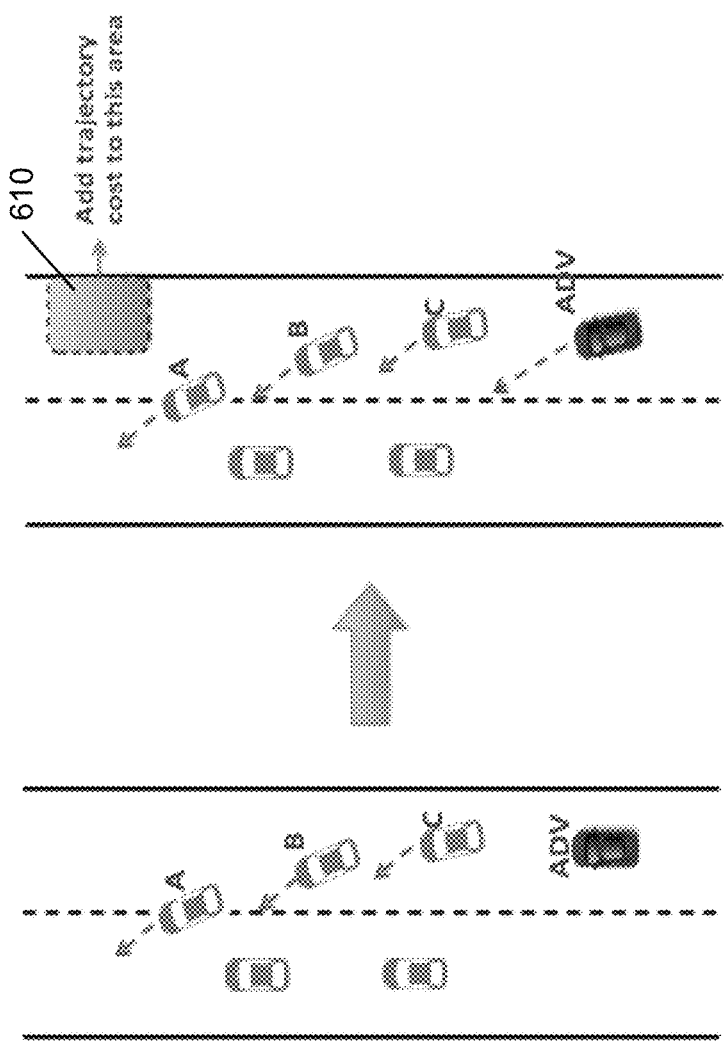

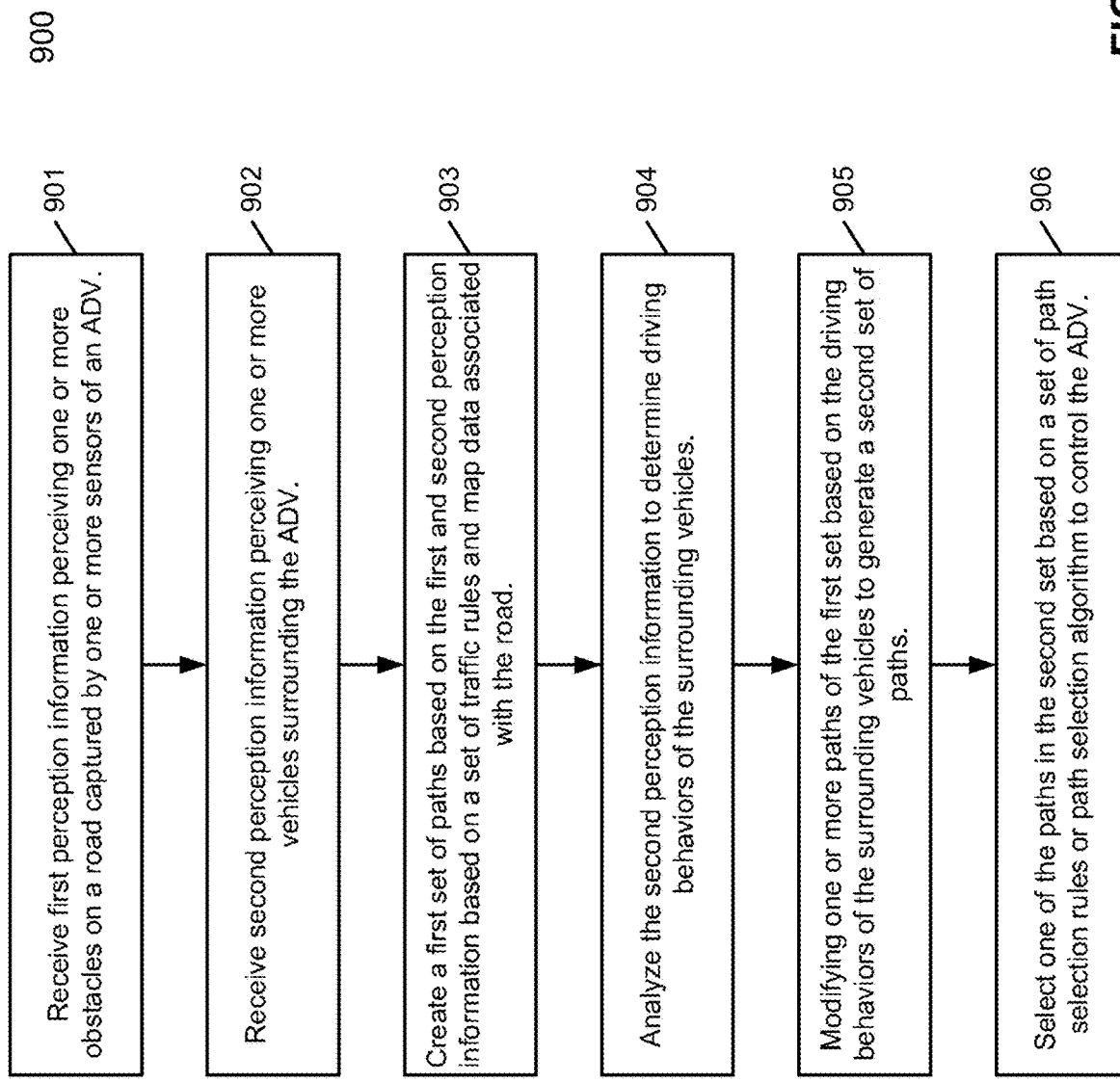

REAL-TIME PERCEPTION ADJUSTMENT AND DRIVING ADAPTION BASED ON SURROUNDING VEHICLES' BEHAVIOR FOR AUTONOMOUS DRIVING VEHICLES

TECHNICAL FIELD

Embodiments of the present disclosure relate generally to operating autonomous vehicles. More particularly, embodiments of the disclosure relate to adapting autonomous driving of autonomous driving vehicles based on real-time perception.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Paths to control an autonomous driving vehicle (ADV) may be planned based on perception information perceiving a driving environment surrounding the ADV captured by sensors of the ADV. However, an ADV may have very limited perception if it only relies on its current sensor system. It can detect its surroundings within a certain distance limitation with the current sensor technologies.

For example, there is a minimum height requirement in order to detect an obstacle using sensors mounted on an ADV. Some of them can be road blockers, such as a large wide (but short) stone, or small animals. Quite often, there are false obstacles detections, including location, size, type, etc. If the ADU is unable to detect obstacles accurately, it may cause an emergency stop or pause, or some other errors.

BRIEF DESCRIPTION OF THE DRAWINGS

Embodiments of the disclosure are illustrated by way of example and not limitation in the figures of the accompanying drawings in which like references indicate similar elements.

FIGS. 6A and 6B are diagrams illustrating a driving scenario according to one embodiment.

FIG. 9 is a flow diagram illustrating a process of operating an autonomous driving vehicle according to one embodiment.

DETAILED DESCRIPTION

Figure 1:
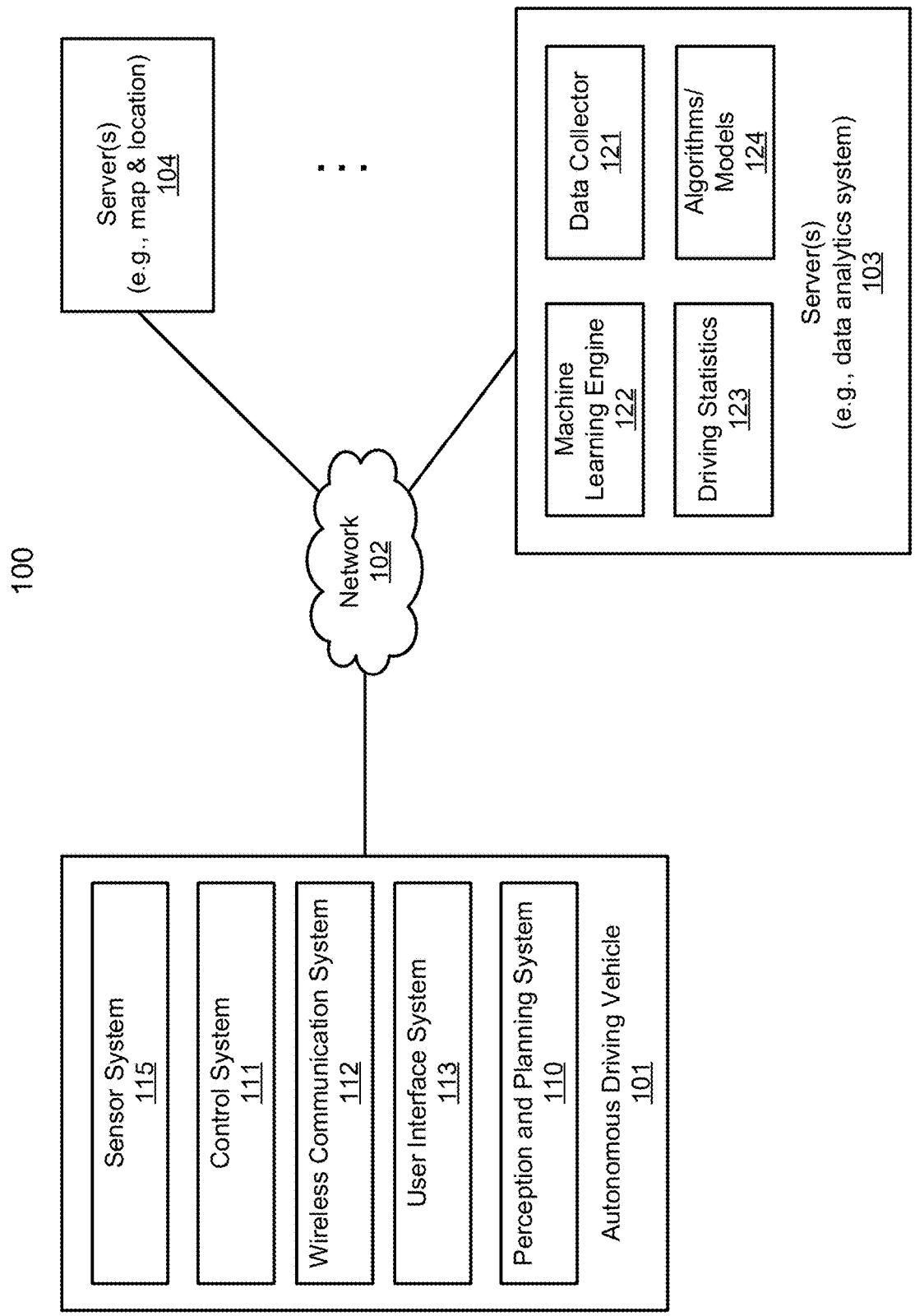
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a real-time perception adjustment and correction and driving adaption method for autonomous driving is provided. The system will analyze the driving behaviors of surrounding vehicles surrounding an ADV, which is utilized to improve its original perception based on the analysis and to adapt to the updated driving environment. In one embodiment, in addition to the perception information provided by the sensors, the system analyzes the behaviors of the surrounding vehicles based on the perception information. Based on the behaviors of the surrounding vehicles, the system may detect there may be an obstacle that has not been detected based on the perception information. Alternatively, the system may detect that an obstacle determined based on the perception information actually may not exist based on the behaviors of the surrounding vehicles. The paths created for the ADV may then adjusted accordingly to improve the autonomous driving of the ADV.

According to one embodiment, first perception information is received, for example, from one or more sensors amounted on an ADV, where the first perception information perceives one or more obstacles within a road. Second perception information is received that perceives one or more vehicles surrounding the ADV. A first set of paths is created based on the first perception information and the second perception information. An analysis is performed on the second perception information to determine the driving behaviors of the surrounding vehicles. One or more paths of the first set are modified based on the analysis of the driving behaviors of the surrounding vehicles. A second set of paths is created based on the modification of the first set of paths. One of the paths in the second set is selected to control the ADV based on a set of one or more path selection rules or selection criteria.

In one embodiment, for each of the surrounding vehicles, a moving trend of the vehicle is determined based on a current position of the surrounding vehicle determined based on the second perception information and a prior position determined based on the driving history of the surrounding vehicle. In modifying the paths of the first set, a path cost of the paths may be adjusted in view of the obstacles observed from the first perception information and the behaviors of the surrounding vehicles, where the selected path is selected with a lowest path cost amongst the second set of paths.

According to another embodiment, the system recognizes that one or more of the surrounding vehicles move around to avoid a first location within the road based on the behaviors of the surrounding vehicles. The system further determines that there is no obstacle within a predetermined proximity of the first location based on the obstacle perception information. In this scenario, there must be something around the first location that the vehicles have to move around and avoid. As a result, the system adds at least one virtual obstacle within the proximity of the first location, and the second set of paths is generated further in view of the virtual obstacle. A path cost of the paths that travel through within a predetermined proximity of the first location may be increased in view of the added virtual obstacle, which can be utilized for subsequent path selections. Alternatively, at least some of the paths in the first set are adjusted (e.g., increasing path costs) based on its relative position or distance with respect to the first location.

According to a further embodiment, the system determines that there is an obstacle located at a first location within the road based on the obstacle perception information. The system further recognizes that one or more of the surrounding vehicles move through or within a predetermined proximity of the first location based on the behaviors of the surrounding vehicles. The obstacle may be removed from the road prior to generating the second set of paths. A path cost of the paths that travel through or within a predetermined proximity of the first location may be decreased in view of the removed obstacle, which can be utilized for subsequent path selections. Alternatively, at least some of the paths in the first set are adjusted (e.g., reducing path costs) based on its relative position or distance with respect to the first location.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
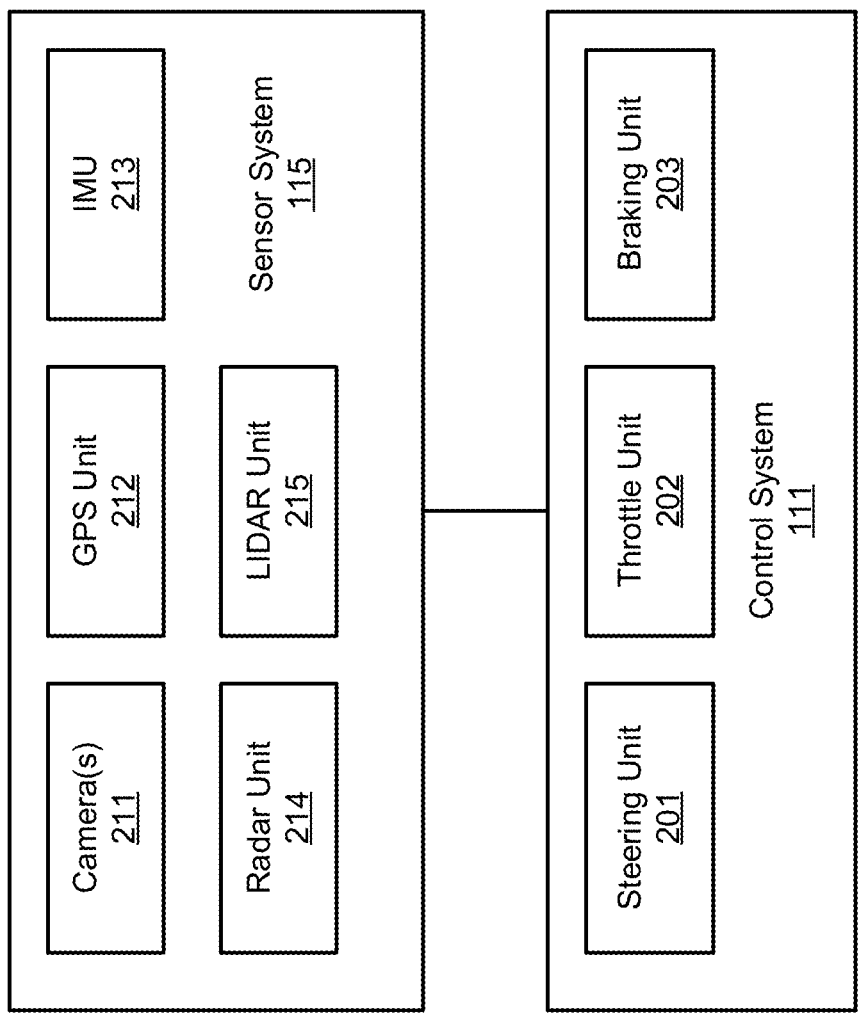
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, the rules, algorithms, and/or predictive models 124 include information regarding how to analyze the perception information of the surrounding vehicles of an ADV to determine the driving behaviors of the surrounding vehicles. The rules, algorithms, and/or predictive models 124 may further include information regarding how to adjust the path costs of the paths based on the driving behaviors of the surrounding vehicles. The term of "surrounding vehicles" refers to the vehicles ahead or in front of a particular ADV, either directly ahead or ahead on an adjacent lane.

Figure 3A:
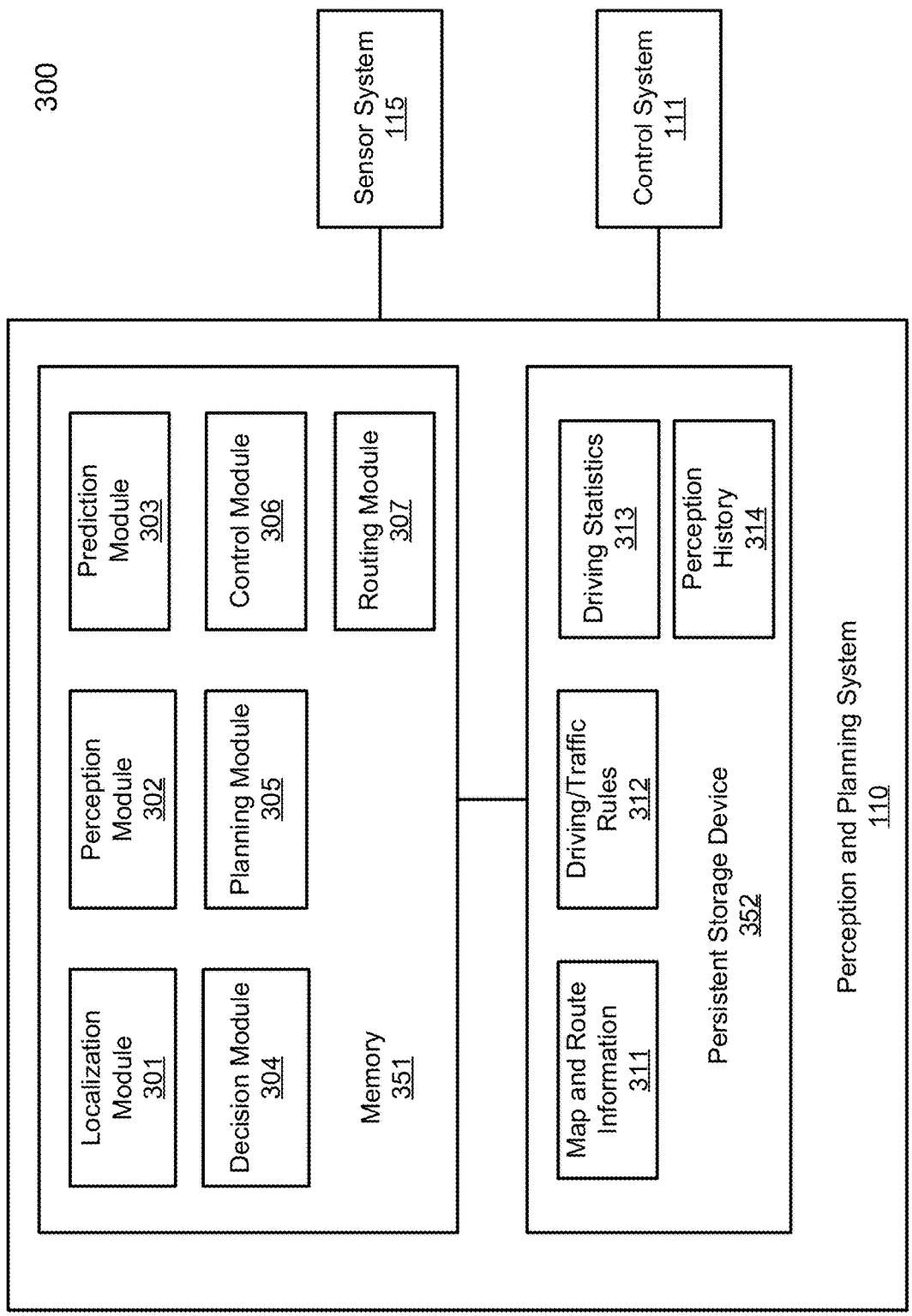
FIGS. 3A and 3B are block diagrams illustrating an example of a perception and planning system used with an autonomous vehicle according to one embodiment.
Figure 3B:
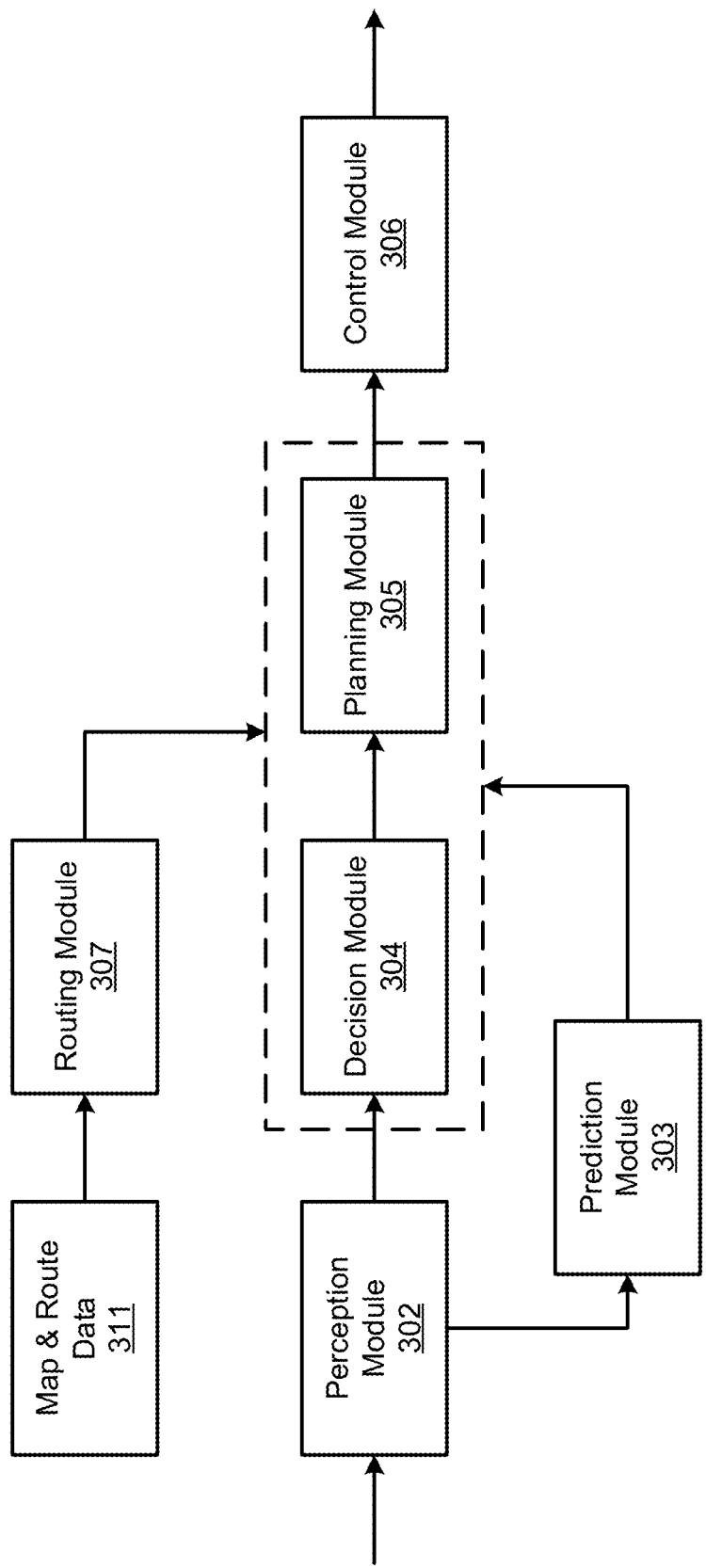

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, the driving statistics of the ADV may be captured and maintained as a part of driving statistics 313 stored in persistent storage device 453. Similarly, the perception information captured by perception module 302 may also be maintained as a part of perception history 314. Such information can be utilized to determine other vehicles' behaviors and to adjust the paths of the ADV accordingly.

Figure 4A:
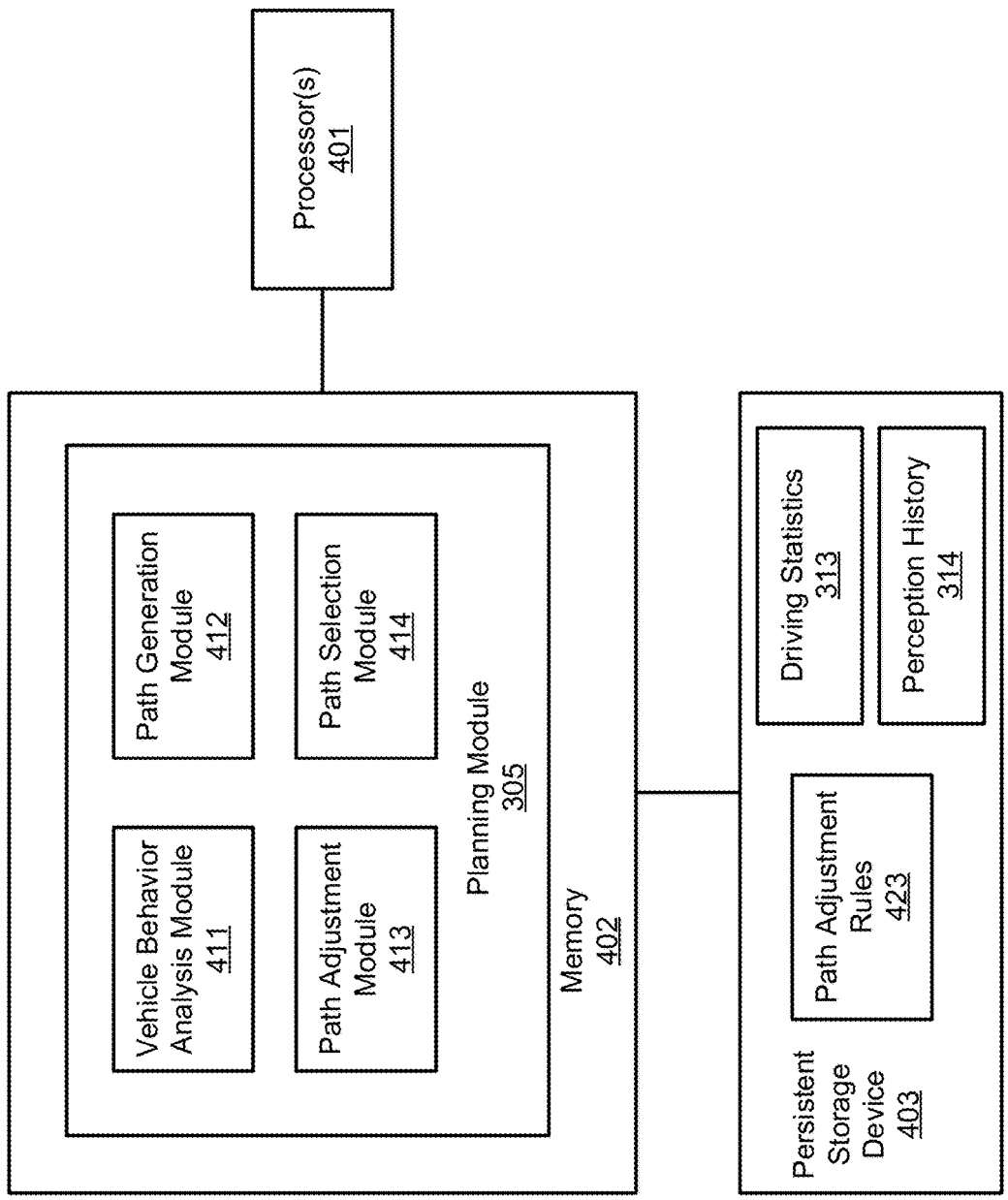
FIGS. 4A and 4B are diagrams illustrating an example of a planning module according to one embodiment.
Figure 4B:
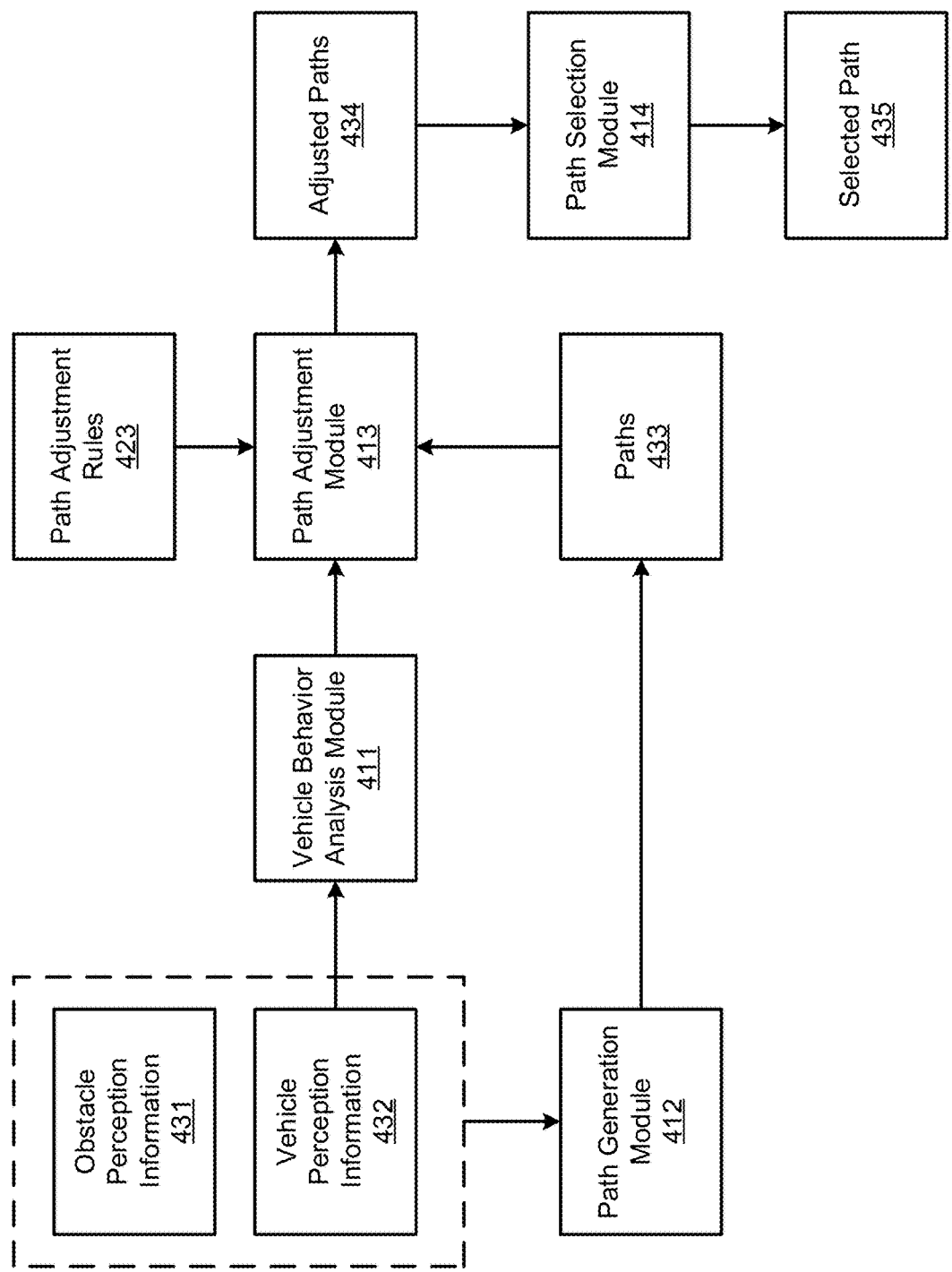

FIG. 4A is a block diagram illustrating an example of a planning module according to one embodiment. FIG. 4B is a processing flow diagram illustrating operations of a planning module according to one embodiment. Referring to FIGS. 4A and 4B, planning module 305 includes, but is not limited to, vehicle behavior analysis module 411, path generation module 412, path adjustment module 413, and path selection module 414. These modules 411-414 can be loaded into memory 402 and executed by one or more processors 401. Modules 411-412 can also be integrated into fewer integrated modules.

According to one embodiment, first perception information, in this example, obstacle perception information 431 perceiving one or more obstacles on the road and second perception information, in this example, surrounding vehicle perception information 432 perceiving one or more surrounding vehicles, are received from perception module 302. Based on the perception information 431-432, path generation module 412 is configured to generate a first set of paths 433 based on a set of traffic rules and map data associated with the road. Vehicle behavior analysis module 411 analyzes at least the surrounding vehicle perception information to determine the behaviors of the vehicles surrounding the ADV. In view of the behaviors of the surrounding vehicles, path adjustment module 413 is configured to adjust one or more paths of paths 433 based on path adjustment rules 423 to generate a second set of paths as adjusted paths 434. The path adjustment rules 423 may specify how the paths are adjusted, such as, for example, how much path cost should be adjusted. Path selection module 414 then selects one of the paths 434 using a path selection rule or path selection criteria, where the selected path 435 will be utilized to control the ADV. The path selection rules or criteria may specify how a path should be selected, such as, for example, based on the lowest path cost.

In one embodiment, in analyzing the driving behaviors of the vehicles, for each of the surrounding vehicles, vehicle behavior analysis module 411 determines a current position (of a current planning cycle) of the vehicle based on the vehicle perception information 432 and/or obstacle perception information 431. The vehicle behavior analysis module 411 further determines a prior position (of a prior planning cycle) of the vehicle, which may be obtained based on the perception history 422 associated with the vehicle. The vehicle behavior analysis module 411 can then determines the moving trend of the vehicle as a part of the driving behavior of the vehicle.

In one embodiment, when modifying one or more paths of the first set 433, path adjustment module 413 modifies a path cost of the paths in view of the obstacles observed based on the first perception information 431 and the driving behaviors of the surrounding vehicles. A second set of paths 434 is generated with the modified path costs of the paths. A path cost represents a cost of an ADV may incur on driving on a particular path in terms of risks of colliding with an obstacle or comfort level of the passenger. A higher cost of a path indicates a higher chance or probability of colliding with an obstacle or higher degree of discomfort of passengers. The selected path 435 is selected from the adjusted paths 434 based on a set of path selection rules or path selection criteria. In a particular embodiment, the selected path 435 has the least path cost amongst the paths in the second set 434.

Figure 5:
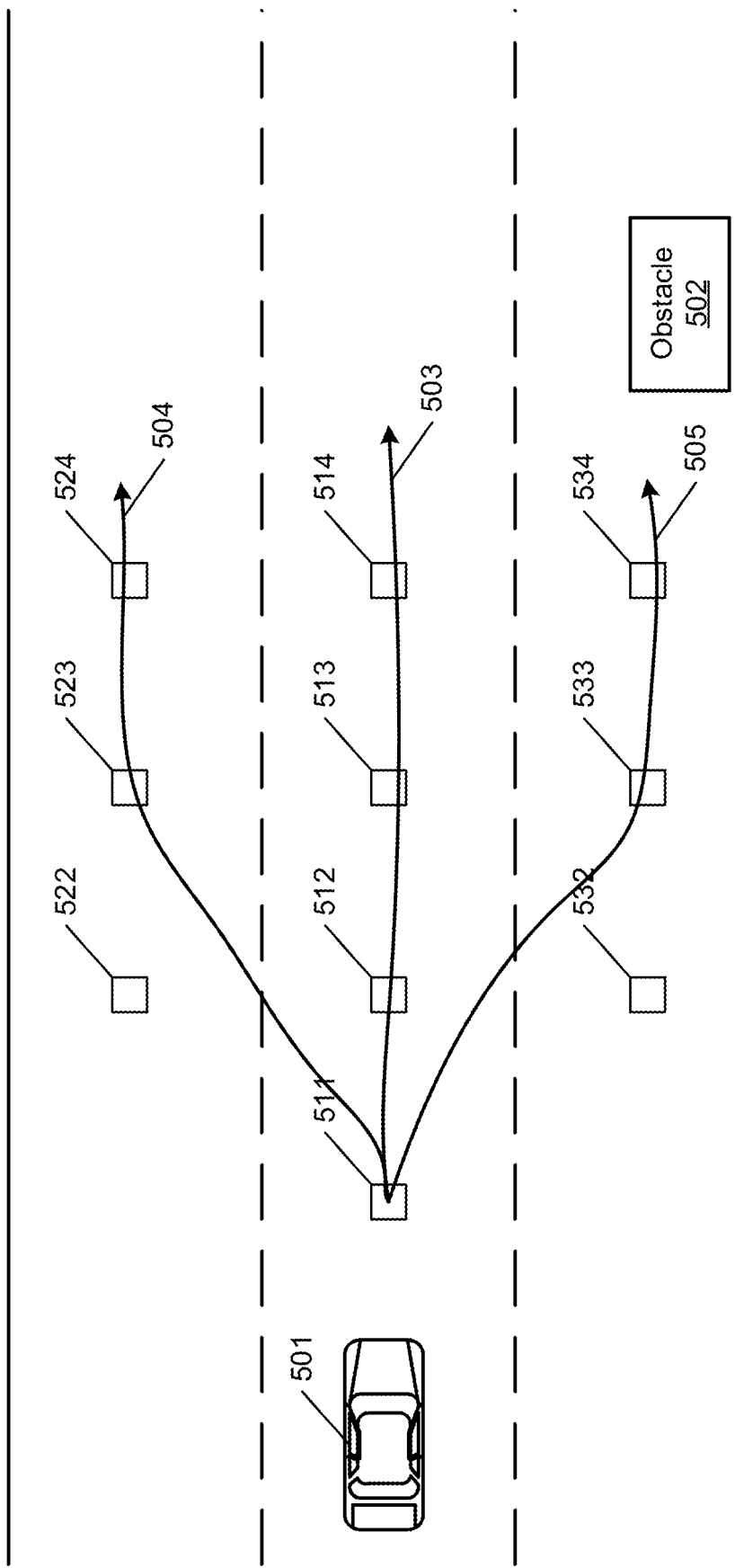
FIG. 5 is a diagram illustrating a process of path planning according to one embodiment.

Referring now to FIG. 5, in this example, it is assumed there are three lanes which may be obtained from the map data. Each lane includes a sequence of reference points that constitute the lane, which may be configured by planning module 305 or routing module 307. Each reference point is associated with a reference point cost. A path cost is calculated based on the costs of the reference points associated with the path using a predetermined mathematical formula, such as, for example, by summing the costs of all reference points.

In this example, assuming there is no obstacle on the road, path generator 412 generates a first set of paths 503-505 based on the perception information 431-432. Thus, ADV 501 can be controlled to move along any one of the paths 503-505. One of the paths 503-505 eventually will be selected based on a path selection rule or criteria, such as, for example, the least path cost. In this example, path 504 is formed based on reference points 511 and 522-524; path 503 is formed based on reference points 511-514; and path 505 is formed based on reference points 511 and 532-534. Based on the current position of ADV 101, each of the reference points 511-514, 522-514, and 532-534 is assigned with a reference point cost. In one embodiment, the reference point cost of a reference point may be related to a distance between the reference point and a nearby obstacle. For example, the costs of reference points 522-524 and 532-534 may be higher than reference points 512-514, because they are closer to the edges of the road. In this example, an edge of a road is considered as an obstacle because it affects the safety of the vehicle and comfort of the passengers. As a result, in this example, path 503 may be selected because its path cost will be the lowest.

According to one embodiment, based on the driving behaviors of the surrounding vehicles, vehicle behavior analysis module 411 may determine that there is an obstacle on the road, even though such an obstacle may not show as part of obstacle perception information 431. In this example, based on the driving behaviors of the surrounding vehicles, the path adjustment module 413 determines obstacle 502 is located at that particular location within the road. In view of obstacle 502, path adjustment module 413 modifies the costs of at least some of the reference points of at least some of the paths 503-505. The increased costs of certain reference points indicate there is an obstacle within the proximity of the related reference points. In one embodiment, the path adjustment module 413 may increase the costs of reference points 533-534 and 514, because they are closer to obstacle 502. Alternatively, the costs of all reference points within a predetermined proximity of obstacle 502 may be proportionally adjusted based on their respective relative position or distance with respect to obstacle 502. The modified first set of paths becomes a second set of paths 434 after the modification. When path selection module 414 selects one of the paths from the second set, path 504 may be selected due to the modified path costs of paths 503-505.

FIG. 6A shows a particular driving scenario according to one embodiment. Referring to FIG. 6A, it is determined that the surrounding vehicles surrounding the ADV, in this example, vehicles A, B, and C, all change lane from the right lane to the left lane. Based on the obstacle perception information, there is no obstacle on the right lane. But based on the driving behaviors of vehicles A-C, the system may consider that there must be something that blocks the right lane. The system then adds a virtual obstacle 610 at the location of which vehicles A-C tried to avoid as shown in FIG. 6B. Accordingly, the path costs of paths travelling through or within a predetermined proximity of that particular location 610 may be increased. A path with the increased cost reduces the chances of being selected subsequently, which in turn cause the ADV to avoid that particular location associated with the virtual obstacle 610.

Figures 7A, 7B:
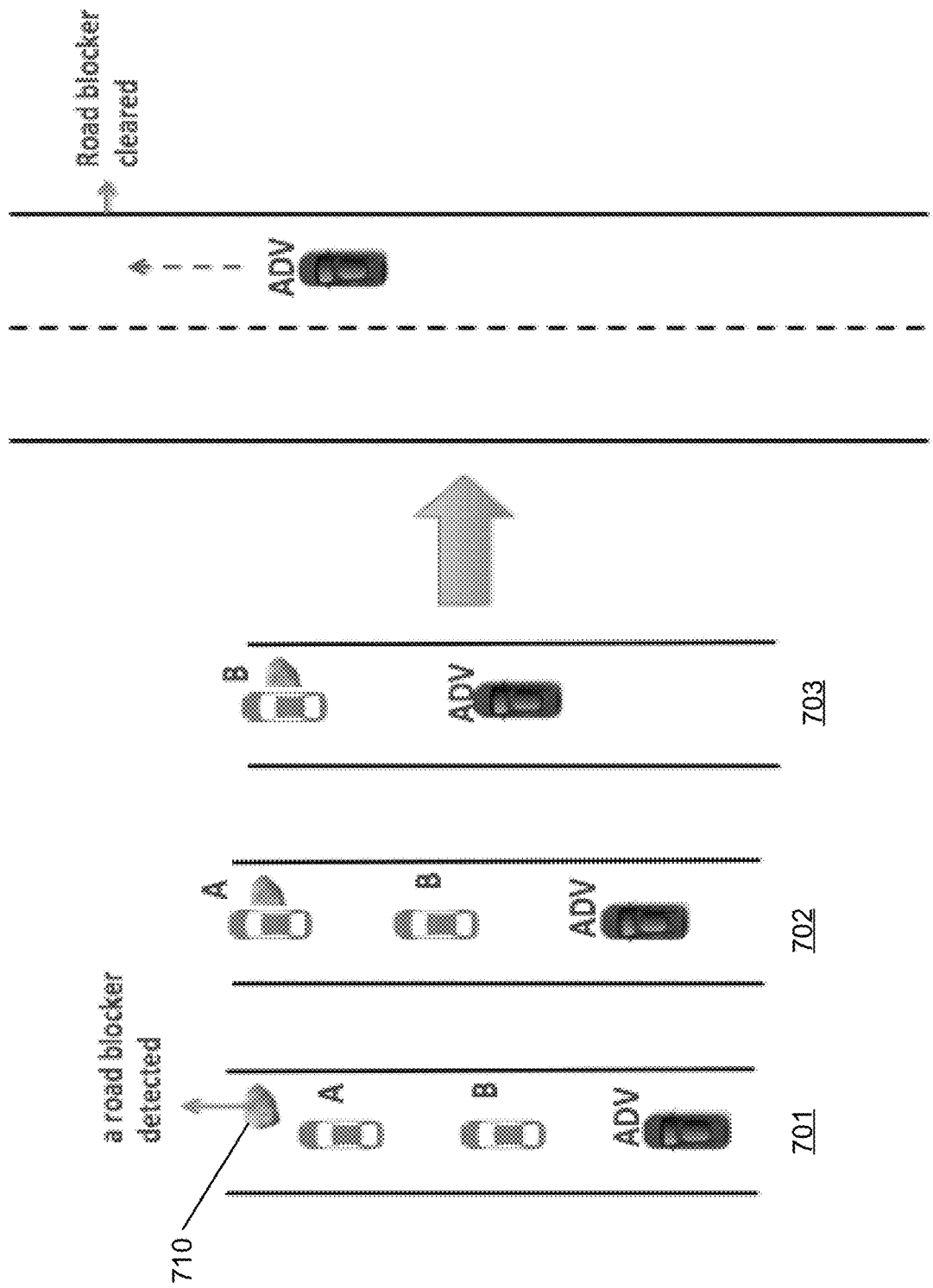
FIGS. 7A and 7B are diagrams illustrating a driving scenario according to another embodiment.

FIG. 7A shows another driving scenario according to another embodiment. Referring to FIG. 7A, in this example, obstacle 710 is detected based on obstacle perception information 431 at point in time 701. However, at point in time 702, it is detected that vehicle A drives through or within a predetermined proximity of obstacle 710 based on vehicle perception information 432. Subsequently at point in time 703, vehicle B also drives through or within a predetermined proximity of obstacle 710. If more than a predetermined number of vehicles driving through the location of obstacle 710, the system may determine that the obstacle 710 may not exist and the system may remove obstacle 710 by decreasing the path costs of the paths closed to the obstacle 710, as shown in FIG. 7B. In one embodiment, if all of the vehicles upfront drive passing through the predetermined proximity of obstacle 710, obstacle 710 will be completely removed. If most or all of the surrounding vehicles can drive along the center line of the lane or road bypassing obstacle 710 without dodging it, a particular type of cost, such as the dodge cost of the associated paths may be deceased. This situation refers to a partially blocked driving scenario.

Figure 8B:
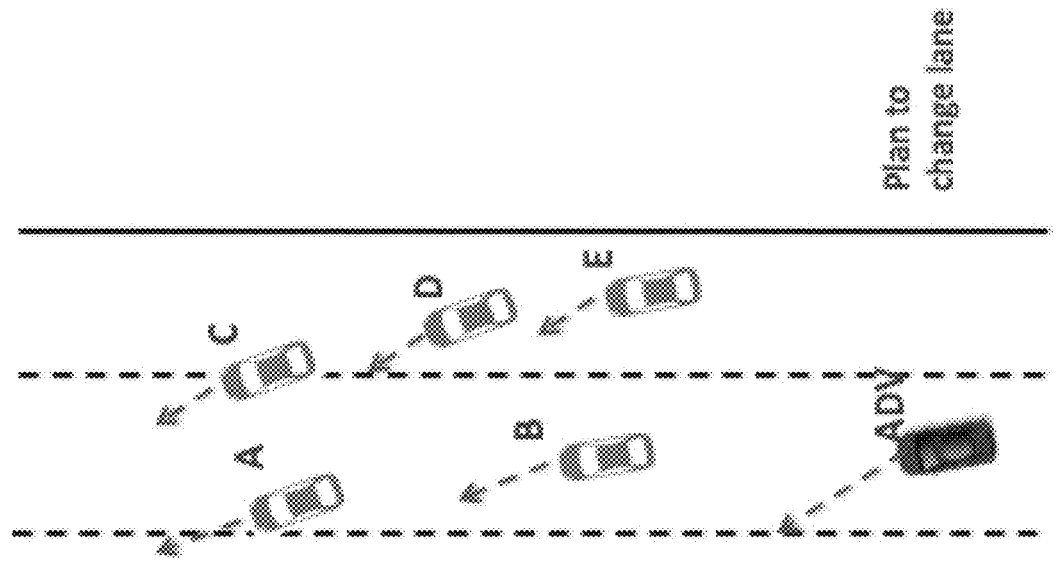
FIGS. 8A and 8B are diagrams illustrating a driving scenario according to another embodiment.
Figure 8A:
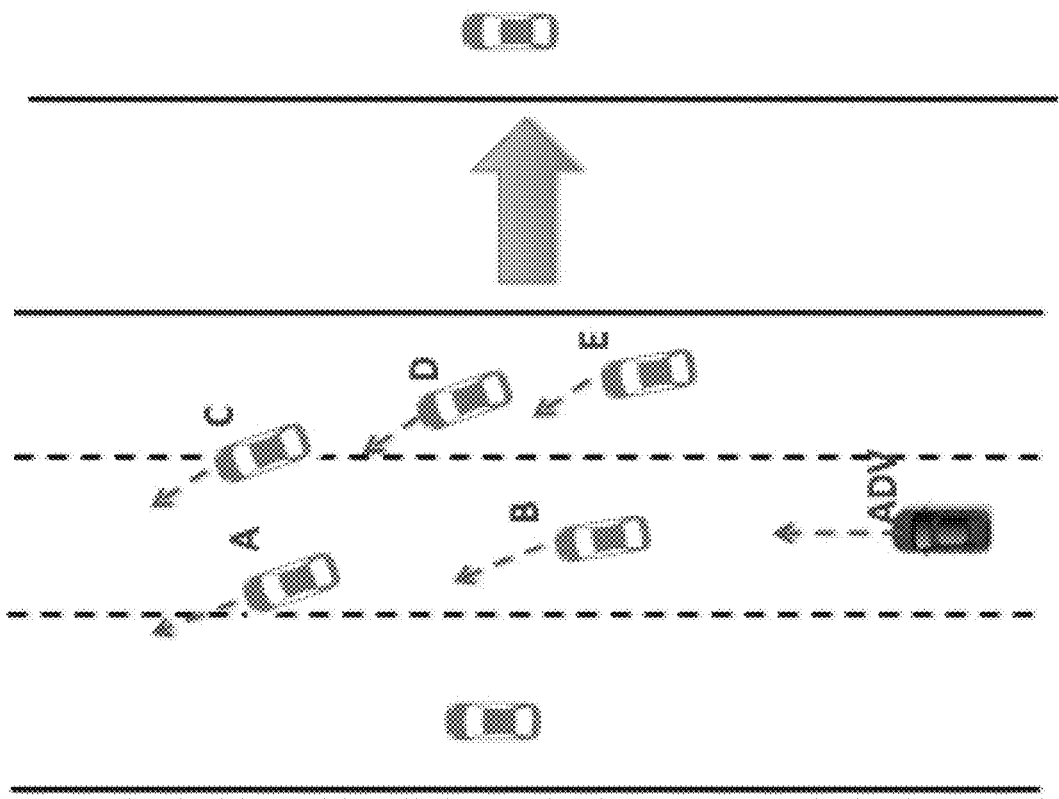

According to one embodiment, the techniques described above can be utilized to plan an ADV earlier based on the driving behaviors of the surrounding vehicles as shown in FIGS. 8A and 8B. Referring to FIG. 8A, in this example, the system detects that all of the vehicles ahead of the ADV change lane from the right lane to the left lane, although there is no obstacle detected based on the perception information. The system can generate an alert or change the routing to follow the traffic by changing lane as well to avoid the last minute rerouting as shown in FIG. 8B.

FIG. 9 is a flow diagram illustrating a process of operating an autonomous driving vehicle based on the driving behaviors of surrounding vehicles according to one embodiment. Process 900 may be performed by processing logic which may include software, hardware, or a combination thereof. For example, process 900 may be performed by planning module 305. Referring to FIG. 9, in operation 901, first perception information is received, for example, from perception module 302, perceiving one or more obstacles on a road or lane, which are captured by one or more sensors of an ADV. In operation 902, second perception information is received perceiving one or more vehicles surrounding the ADV. In operation 903, a first set of paths is created based on the first perception information and the second perception information, for example, using a set of traffic rules and map data associated with the road. In operation 904, the second perception information is analyzed to determine the driving behaviors of the surrounding vehicles. In operation 905, one or more paths of the first set of paths are modified based on the analysis of the driving behaviors of the surrounding vehicles. A second set of paths is generated accordingly. In operation 906, one of the paths in the second set is selected based on a set of one or more path selection rules (e.g., minimum path cost) to control the ADV.

Figure 10A:
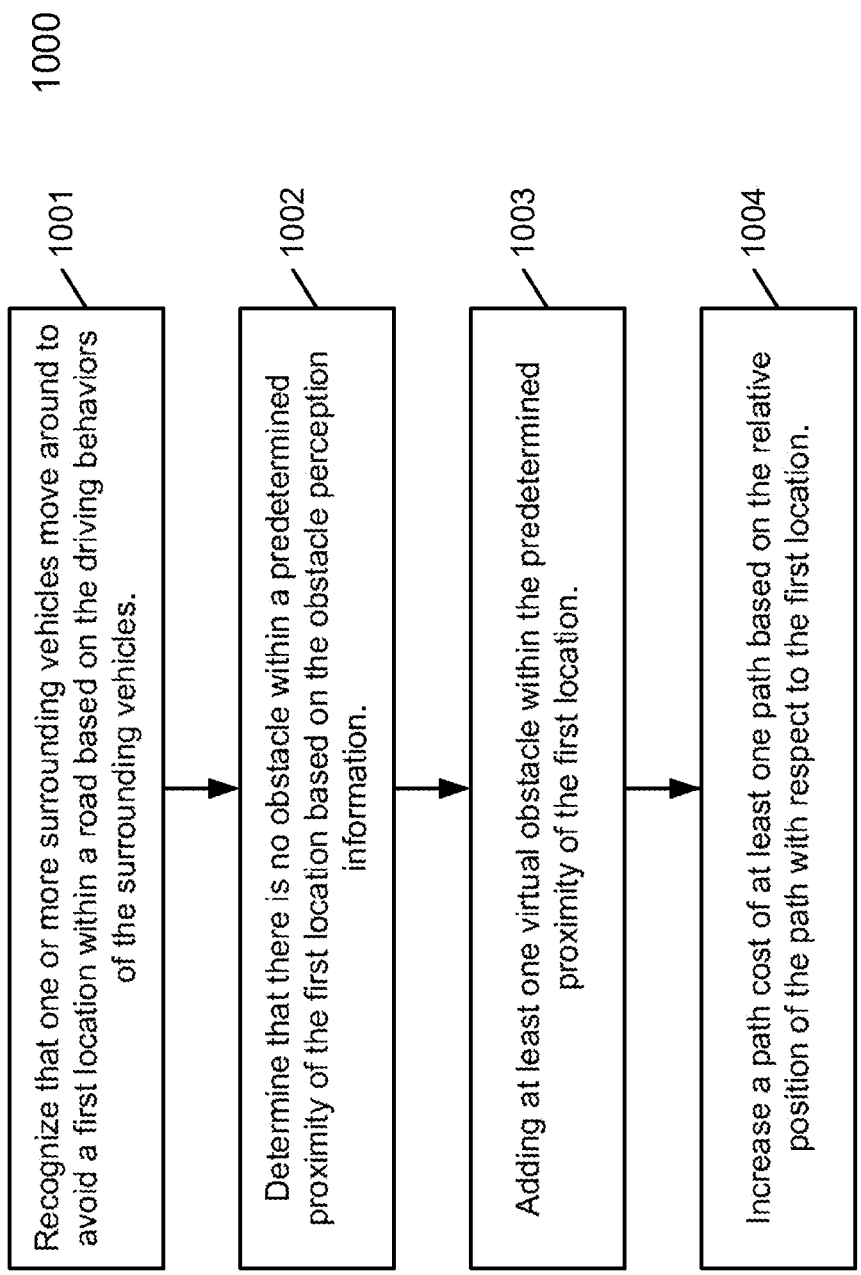
FIGS. 10A and 10B are flow diagrams illustrating a process of modifying paths based on driving behaviors of surrounding vehicles according to certain embodiments.

FIG. 10A is a flow diagram illustrating a process of modifying a path of an autonomous driving vehicle based on driving behaviors of surrounding vehicles according to one embodiment. Process 1000 may be performed as a part of operation 905 of FIG. 9. Referring to FIG. 10A, in operation 1001, processing logic recognizes that one or more vehicles move around to avoid a first location within a road based on the driving behaviors of the vehicles. In operation 1002, processing logic determines that there is no obstacle within a predetermined proximity of the first location based on the obstacle perception information. In operation 1003, processing logic adds a virtual obstacle within the predetermined proximity of the first location. In operation 1004, a path cost is increased for any path travelling through and within the predetermined proximity of the first location. Alternatively, the path cost is proportionally increased based on the relative position of the path and the first location (e.g., distance between the path and the first location).

Figure 10B:
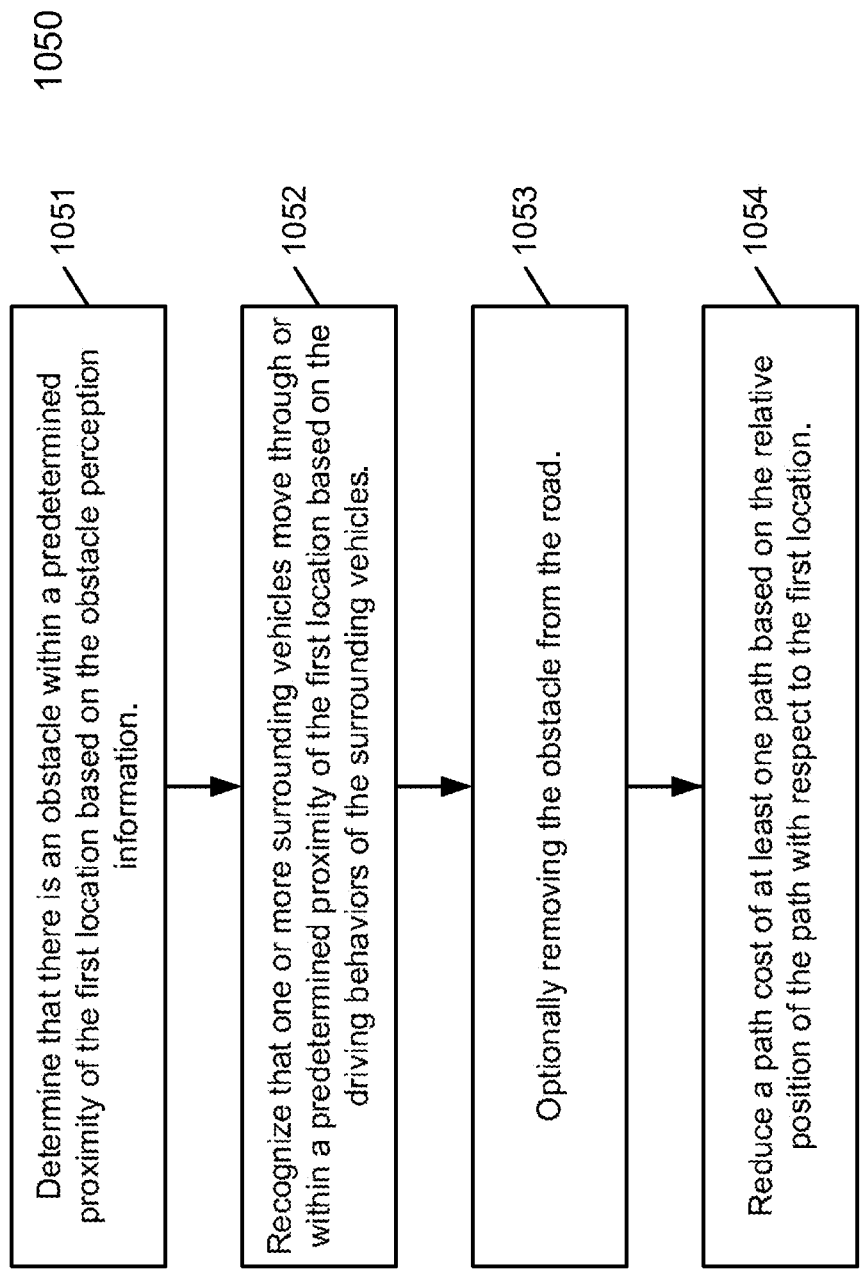

FIG. 10B is a flow diagram illustrating a process of modifying a path of an autonomous driving vehicle based on driving behaviors of surrounding vehicles according to another embodiment. Process 1050 may be performed as a part of operation 905 of FIG. 9. Referring to FIG. 10B, in operation 1051, it is determined there is an obstacle located at a first location within the road based on the obstacle perception information. In operation 1052, processing logic recognizes that one or more surrounding vehicles move through or within a predetermined proximity of the first location based on the driving behaviors of the vehicles. In operation 1053, the obstacle is removed from the road. In operation 1054, a path cost of any path that travels through or within the proximity of the first location is decreased. Alternatively, the path cost is proportionally reduced based on the relative position of the path and the first location (e.g., distance between the path and the first location).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
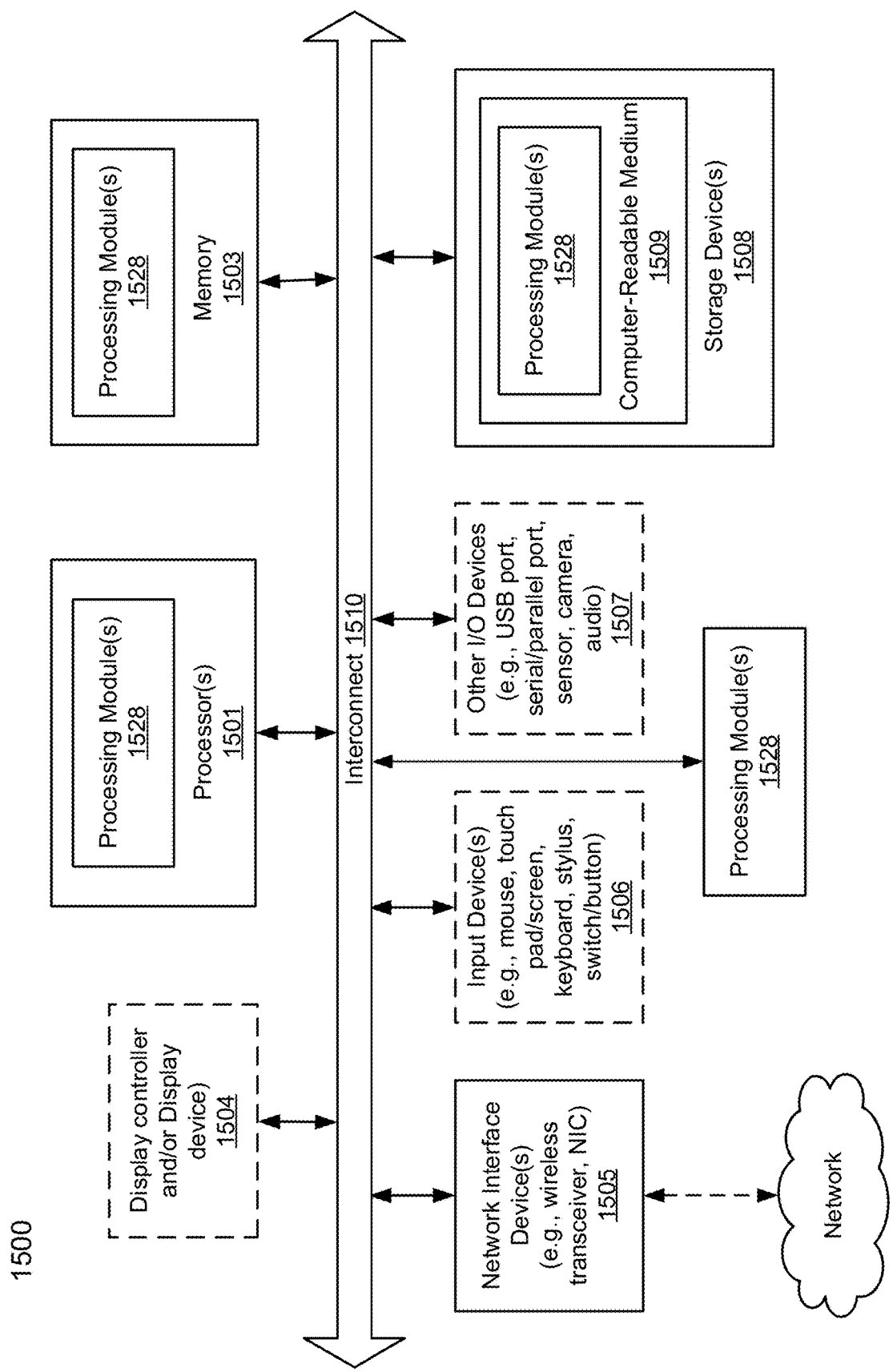
FIG. 11 is a block diagram illustrating a data processing system according to one embodiment.

FIG. 11 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305 and/or control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    receiving first perception information perceiving one or more obstacles on a road captured by one or more sensors of an autonomous driving vehicle (ADV);
    receiving second perception information perceiving one or more vehicles surrounding the ADV;
    creating a first set of paths based on the first perception information and second perception information based on a set of traffic rules and map data associated with the road;
    analyzing the second perception information to determine driving behaviors of the surrounding vehicles;

modifying one or more paths of the first set based on the analysis of the driving behaviors of the surrounding vehicles, generating a second set of paths; and
selecting one of the paths in the second set based on a set of one or more path selection rules to control the ADV.

2. The method of claim 1, wherein analyzing the second perception information comprises:
for each of the surrounding vehicles, determining a current position of the surrounding vehicle; and
determining a moving trend of the surrounding vehicle based on the current position and a prior position of the surrounding vehicle in view of positions of the obstacles.

3. The method of claim 1, wherein modifying one or more paths of the first set comprises adjusting a path cost of the paths in view of the obstacles observed from the first perception information and the behaviors of the surrounding vehicles, wherein the selected path is selected with a lowest path cost amongst the second set of paths.

4. The method of claim 1, wherein modifying one or more paths of the first set comprises:
recognizing that one or more of the surrounding vehicles move around to avoid a first location within the road based on the behaviors of the surrounding vehicles;
determining that there is no obstacle within a predetermined proximity of the first location based on the first perception information; and
adding at least one virtual obstacle within the proximity of the first location, wherein the second set of paths is generated further in view of the virtual obstacle.

5. The method of claim 4, further comprising increasing a path cost of any of the paths in the first set that travel through within the predetermined proximity of the first location, wherein the selected path has a lowest path cost amongst the paths in the second set.

6. The method of claim 4, wherein the selected path is configured to cause the ADV to move around and to avoid the first location.

7. The method of claim 1, wherein modifying one or more paths of the first set comprises:
determining that there is an obstacle located at a first location within the road based on the first perception information;
recognizing that one or more of the surrounding vehicles move through within a predetermined proximity of the first location based on the behaviors of the surrounding vehicles; and
removing the obstacle from the road prior to generating the second set of paths.

8. The method of claim 6, further comprising reducing a path cost to any of the paths in the first set that travel through within the predetermined proximity of the first location, wherein the selected path has a lowest path cost amongst the paths in the second set.

9. A non-transitory machine-readable medium having instructions stored therein, which when executed by a processor, cause the processor to perform operations of operating an autonomous driving vehicle, the operations comprising:
receiving first perception information perceiving one or more obstacles on a road captured by one or more sensors of an autonomous driving vehicle (ADV);
receiving second perception information perceiving one or more vehicles surrounding the ADV;
creating a first set of paths based on the first perception information and second perception information based on a set of traffic rules and map data associated with the road;
analyzing the second perception information to determine driving behaviors of the surrounding vehicles;
modifying one or more paths of the first set based on the analysis of the driving behaviors of the surrounding vehicles, generating a second set of paths; and
selecting one of the paths in the second set based on a set of one or more path selection rules to control the ADV.

10. The machine-readable medium of claim 9, wherein analyzing the second perception information comprises:
for each of the surrounding vehicles, determining a current position of the surrounding vehicle; and
determining a moving trend of the surrounding vehicle based on the current position and a prior position of the surrounding vehicle in view of positions of the obstacles.

11. The machine-readable medium of claim 9, wherein modifying one or more paths of the first set comprises adjusting a path cost of the paths in view of the obstacles observed from the first perception information and the behaviors of the surrounding vehicles, wherein the selected path is selected with a lowest path cost amongst the second set of paths.

12. The machine-readable medium of claim 9, wherein modifying one or more paths of the first set comprises:
recognizing that one or more of the surrounding vehicles move around to avoid a first location within the road based on the behaviors of the surrounding vehicles;
determining that there is no obstacle within a predetermined proximity of the first location based on the first perception information; and
adding at least one virtual obstacle within the proximity of the first location, wherein the second set of paths is generated further in view of the virtual obstacle.

13. The machine-readable medium of claim 12, wherein the operations further comprise increasing a path cost of any of the paths in the first set that travel through within the predetermined proximity of the first location, wherein the selected path has a lowest path cost amongst the paths in the second set.

14. The machine-readable medium of claim 12, wherein the selected path is configured to cause the ADV to move around and to avoid the first location.

15. The machine-readable medium of claim 9, wherein modifying one or more paths of the first set comprises:
determining that there is an obstacle located at a first location within the road based on the first perception information;
recognizing that one or more of the surrounding vehicles move through within a predetermined proximity of the first location based on the behaviors of the surrounding vehicles; and
removing the obstacle from the road prior to generating the second set of paths.

16. The machine-readable medium of claim 14, wherein the operations further comprise reducing a path cost to any of the paths in the first set that travel through within the predetermined proximity of the first location, wherein the selected path has a lowest path cost amongst the paths in the second set.

17. A data processing system, comprising:
a processor; and
a memory coupled to the processor to store instructions, which when executed by the processor, cause the processor to perform operations, the operations including
receiving first perception information perceiving one or more obstacles on a road captured by one or more sensors of an autonomous driving vehicle (ADV),
receiving second perception information perceiving one or more vehicles surrounding the ADV,
creating a first set of paths based on the first perception information and second perception information based on a set of traffic rules and map data associated with the road,
analyzing the second perception information to determine driving behaviors of the surrounding vehicles,
modifying one or more paths of the first set based on the analysis of the driving behaviors of the surrounding vehicles, generating a second set of paths, and
selecting one of the paths in the second set based on a set of one or more path selection rules to control the ADV.

18. The system of claim 17, wherein analyzing the second perception information comprises:
for each of the surrounding vehicles, determining a current position of the surrounding vehicle; and
determining a moving trend of the surrounding vehicle based on the current position and a prior position of the surrounding vehicle in view of positions of the obstacles.

19. The system of claim 17, wherein modifying one or more paths of the first set comprises adjusting a path cost of the paths in view of the obstacles observed from the first perception information and the behaviors of the surrounding vehicles, wherein the selected path is selected with a lowest path cost amongst the second set of paths.

20. The system of claim 17, wherein modifying one or more paths of the first set comprises:
recognizing that one or more of the surrounding vehicles move around to avoid a first location within the road based on the behaviors of the surrounding vehicles;
determining that there is no obstacle within a predetermined proximity of the first location based on the first perception information; and
adding at least one virtual obstacle within the proximity of the first location, wherein the second set of paths is generated further in view of the virtual obstacle.

21. The system of claim 20, wherein the operations further comprise increasing a path cost of any of the paths in the first set that travel through within the predetermined proximity of the first location, wherein the selected path has a lowest path cost amongst the paths in the second set.

* * * * *